United States Patent
Kejariwal et al.

(10) Patent No.: US 8,065,242 B2
(45) Date of Patent: Nov. 22, 2011

(54) DECISION TREE COALESCING FOR DOCUMENT RANKING

(75) Inventors: Arun Kejariwal, San Jose, CA (US); Sapan Panigrahi, Castro Valley, CA (US); Girish Vaitheeswaran, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 790 days.

(21) Appl. No.: 12/178,483

(22) Filed: Jul. 23, 2008

(65) Prior Publication Data

US 2010/0023474 A1    Jan. 28, 2010

(51) Int. Cl.
G06F 15/18    (2006.01)
(52) U.S. Cl. .......................................... 706/12
(58) Field of Classification Search ...................... 706/12
See application file for complete search history.

(56) References Cited

U.S. PATENT DOCUMENTS

| | | | |
|---|---|---|---|
| 6,470,360 B1 * | 10/2002 | Vaitheeswaran ....................... | 1/1 |
| 6,687,702 B2 * | 2/2004 | Vaitheeswaran et al. .............. | 1/1 |
| 6,721,765 B2 * | 4/2004 | Ghosh et al. ........................... | 1/1 |
| 7,421,562 B2 * | 9/2008 | Bhatt et al. ..................... | 711/203 |
| 7,447,710 B2 * | 11/2008 | Sampath et al. ....................... | 1/1 |

OTHER PUBLICATIONS

Application of improved artificial immune network algorithm to optimization, Yunfeng Zhao; Yixin Yin; Dongmei Fu; Zhun Zhou; Ping Yin; Jia Wang; Systems and Control in Aerospace and Astronautics, 2008. ISSCAA 2008. 2nd International Symposium on Digital Object Identifier: 10.1109/ISSCAA.2008.4776253 Publication Year: 2008 , pp. 1-6.*

Using classification and key phrase extraction for information retrieval, Minjuan Zhong; Zhiping Chen; Yaping Lin; Jintao Yao; Intelligent Control and Automation, 2004. WCICA 2004. Fifth World Congress on vol. 4 Digital Object Identifier: 10.1109/WCICA.2004.1343076 Publication Year: 2004 , pp. 3037-3041 vol. 4.*

Object Recognition and Sorting by Using a Virtual Cartesian Robot with Artificial Vision, Garcia Palmero, D.S.; Perez, A.A.; Ortiz, M.I. M.; Amaro, F.J.; Rodriguez Henriquez, F.; Electronics, Communications and Computers, 2005. CONIELECOMP 2005. Proceedings. 15th International Conference on Digital Object Identifier: 10.1109/CONIEL.2005.54.*

Cranai: a new search model reinforced by combining a ranking algorithm with author inputs, Lai, J.; Soh, B.; e-Business Engineering, 2005. ICEBE 2005. IEEE International Conference on Digital Object Identifier: 10.1109/ICEBE.2005.44 Publication Year: 2005 , pp. 340-345.*

* cited by examiner

*Primary Examiner* — Michael B Holmes
*Assistant Examiner* — Ababacar Seck
(74) *Attorney, Agent, or Firm* — Stattler—Suh PC

(57) ABSTRACT

Machine-learned ranking algorithms, e.g. for ranking search results, often use a sequence of decision trees involving decision nodes based on threshold values of features. Modules, systems and methods of optimizing such algorithms involve analyzing threshold feature values to determine threshold intervals for each feature and grouping decision trees according to the feature used in a root decision node. Then coalescing the decision trees within each group to form a coalesced group tree for each group and finally coalescing the coalesced group trees to form a coalesced tree that implements the algorithm.

17 Claims, 4 Drawing Sheets

DECISION TREE COALESCING FOR DOCUMENT RANKING

BACKGROUND OF THE INVENTION

1. Field of the Invention

Embodiments of the invention relate to document ranking and to optimization of document-ranking algorithms for the web.

2. Art Background

Web search and content-based advertising are two of the important applications of the Internet. One important component of web search, and of some content-based advertising systems, is document ranking. Relevant documents, e.g. web documents or advertisements, are ranked with respect to a given query or content, based on a multitude of metrics such as degree of query match and freshness of the document. Several advanced ranking techniques are in development to improve search result and advertising match accuracy. However, in many cases, such advanced techniques are computationally intensive and thus cannot be deployed in production, which in turn limits the scope of improvements to search ranking and content-based advertising.

SUMMARY OF THE INVENTION

Embodiments consistent with the present invention enable the use of advanced or computationally intensive ranking techniques without impacting the query processing time by employing novel decision-tree coalescing based optimization techniques.

In a first aspect, some embodiments of the invention relate to computer-implemented methods of optimizing machine-learned ranking (MLR) algorithms. Methods consistent with embodiments of this aspect operate on MLR algorithms implementable as a sequence of decision trees involving decision nodes based on threshold values of features. For example, a method of optimization involves analyzing the threshold feature values to determine threshold intervals for each feature, grouping the decision trees according to the feature used in a root decision node, then coalescing the decision trees within each group to form a coalesced group tree for each group, and finally coalescing the coalesced group trees to form a coalesced tree that implements the algorithm.

In a second aspect, some embodiments relate to ranking optimization modules. Preferably, ranking optimization modules consistent with this aspect operate on MLR algorithms implementable as a sequence of decision trees involving decision nodes based on threshold values of features. Some ranking optimization modules consistent with embodiments of the present invention comprise: a grouping element, an interval determination element, and a coalescing element. The grouping element is configured to group the decision trees according to the feature used in a root decision node. The interval determination element is configured to analyze the threshold feature values to determine threshold intervals for each feature. The coalescing element is configured to coalesce the decision trees within each group to produce a coalesced group tree for each group and also to coalesce the coalesced group trees to produce a coalesced tree that implements the algorithm.

In a third aspect, some embodiments of relate to systems for providing results ranked by an optimized machine-learned ranking algorithm. For example, a system consistent with some embodiments comprises a retrieval module, a ranking module, and a serving module. The retrieval module selects a document set based on an action by a user. The ranking module ranks the document set based on a machine-learned ranking algorithm optimized via decision-tree coalescing to form a ranked results set. The serving module serves a portion of the ranked results set to the user.

DETAILED DESCRIPTION

Ranking in Web Search and Advertising

Figure 1:
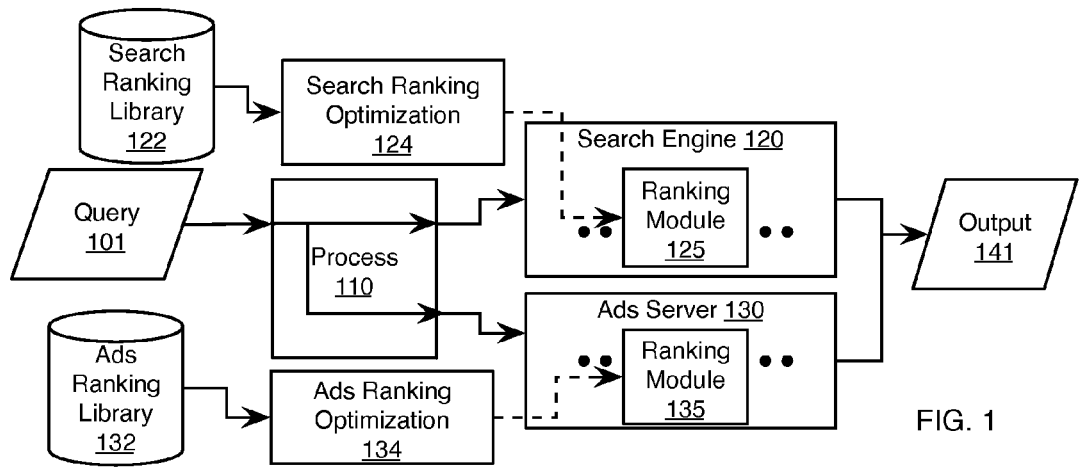
FIG. 1 is a diagram outlining backend processing steps required to serve search results based on ranking elements consistent with some embodiments of the present invention.

FIG. 1 shows a workflow by which a search results page comprising ranked elements is generated in response to a search query. First, a query 101 is received by process 110, which performs preprocessing operations to produce a processed query. Typical preprocessing operations include filtering, sanitization, stemming, stop-word removal, and canonical format conversion. Typically the processed query is provided to two separate sub-process pipelines. The search engine pipeline 120 selects relevant web content, which is usually referenced by a URL or URI on the World-Wide-Web, and ranks the content in order of relevance to the pre-processed query. This ranking forms the final algorithmic search results set for the query. The ads pipeline 130 ranks ads, either text-based or graphical, also in order of relevance to the pre-processed query. Typically the rankings determine placement of ads and search results within the results page.

Consistent with the present invention, ranking of web content within the search engine pipeline 120 is performed by the web-ranking module 125. In some embodiments other modules within the search engine pipeline perform selection. Furthermore, consistent with embodiments of the present invention, the web ranking module 125 employs an optimization of a machine-learned ranking (MLR). The MLR is stored in search ranking library 122. Preferably the MLR is implementable as a sequence of decision trees. Search ranking optimization module 124 optimizes the MLR from search ranking library 122 and provides an optimized MLR to ranking module 125. Preferably this optimization process occurs offline, e.g. during compilation of search ranking library 122 to form machine code where the web ranking module 125 is embodied as machine code. Furthermore, optimization within the search ranking optimization module 125 preferably proceeds via decision tree coalescing consistent with embodiments of the present invention.

Similarly, within the ads serving pipeline 130, ranking of ads is performed by ads ranking module 135. In some embodiments other modules within the search engine pipeline perform selection. Furthermore, consistent with embodiments of the present invention, the ads ranking module 135 employs an optimization of a machine-learned ranking (MLR). The MLR is stored in search ranking library 132. Preferably the MLR is implementable as a sequence of decision trees. Ads ranking optimization module 134 optimizes the MLR from ads ranking library 132 and provides an optimized MLR to ranking module 135. Preferably this optimization process occurs offline, e.g. during compilation of ads ranking library 132 to form machine code where the ads ranking module 135 is embodied as machine code. Furthermore, optimization within the ads ranking optimization module 135 preferably proceeds via decision tree coalescing consistent with embodiments of the present invention.

An output 141, e.g. a search results page, delivered in response to the query 101 draws on rankings produced by both the ads serving pipeline 130 and search engine pipeline 120.

Figure 2:
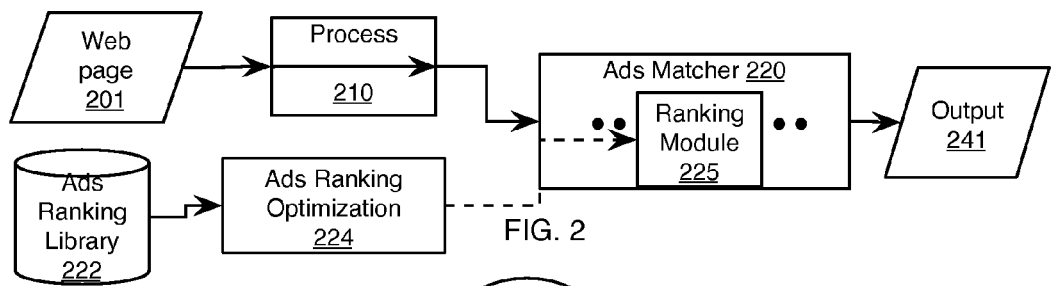
FIG. 2 is a diagram outlining backend processing steps required to serve content-based advertisements based on ranking elements consistent with some embodiments of the present invention.

FIG. 2 shows a workflow by which a web page comprising ranked elements, e.g. content-matched advertising is generated in response to web content. First, web content 201 is received by process 210, which performs preprocessing operations to produce a processed content document. As with web search, typical preprocessing operations include filtering, sanitization, stemming, stop-word removal, and canonical format conversion. The processed content document is provided to an ads matching pipeline 220, which ranks ads, either text-based or graphical, in order of relevance to the processed content document. Ads serving typically involves determining the layout of the ads on the page. Typically the rankings determine placement of ads within the layout.

Consistent with the present invention, ranking of ads within the ads matching pipeline 220 is performed by the ads ranking module 225. In some embodiments other modules within the ads matching pipeline perform selection. Furthermore, consistent with embodiments of the present invention, the ads ranking module 225 employs an optimization of a machine-learned ranking (MLR). The MLR is stored in ads ranking library 222. Preferably the MLR is implementable as a sequence of decision trees. Ads ranking optimization module 224 optimizes the MLR from ads ranking library 222 and provides an optimized MLR to ranking module 225. Preferably this optimization process occurs offline, e.g. during compilation of ads ranking library 222 to form machine code where the ads ranking module 225 is embodied as machine code. Furthermore, optimization within the ads ranking optimization module 225 preferably proceeds via decision tree coalescing consistent with embodiments of the present invention.

An output 241, e.g. a web page with relevant ads, delivered in response to the web content 201 draws on rankings produced by the ads matching pipeline 220.

Decision Tree Coalescing Environment

Preferably, embodiments consistent with the present invention operate on MLR algorithms implementable as a sequence of decision trees. For example, such ranking algorithms include those where the score of a document is incremented in an iterative fashion upon traversal of each tree in a sequence, as shown in the pseudocode snippet below:

for each decision tree
    Traverse each tree until a leaf node is reached
    Update the document score
end for Each iteration of the above snippet above involves traversing a decision tree. The score of the document is incremented by the value stored in the leaf node whenever a leaf node is reached. Such algorithms may operate on binary trees, including unbalanced binary trees.

Figure 3:
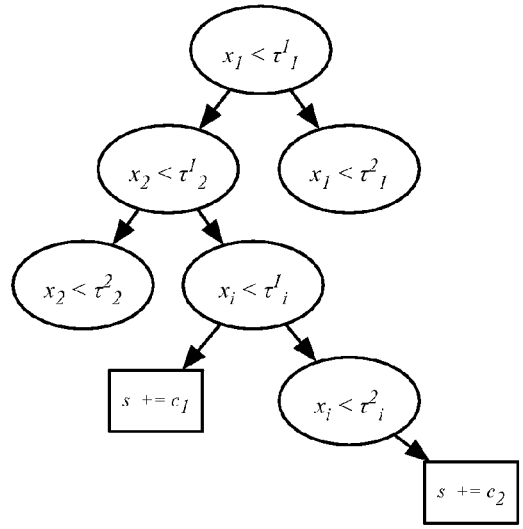
FIG. 3 illustrates a decision tree onto which a portion of a machine-learned ranking algorithm is mappable consistent with some embodiments of the present invention.

FIG. 3 illustrates an exemplary unbalanced binary decision tree consistent with an implementation of an MLR operated on by some embodiments. Preferably the algorithms are implemented such that each internal node of each tree consists of an evaluation of the form: $x_i < \tau^i_j$, where $x_i$ is the value of the ith feature, e.g. the number of words, for the ith document and $\tau^i_j$ is the jth threshold value for the ith feature.

The tree illustrated in FIG. 3 begins with a root node comprising the evaluation $x_1 < \tau^1_1$, contains multiple internal nodes, and ends at leaf nodes with updating of the document score s by a constant, e.g. $c_1$ or $c_2$.

Figure 4:
FIG. 4 illustrates a number line onto which threshold values from a decision tree are mapped for interval analysis consistent with some embodiments of the present invention.

As FIG. 3 shows, a feature value, e.g. $x_1$ may be used in multiple nodes of a given decision tree; however, the corresponding threshold values in the conditionals are typically different to avoid redundancy. The threshold values operated on by the decision tree for a variable $x_i$ delimit the different intervals on the number line in which $x_i$ lies for a corresponding path in the decision tree. FIG. 4 illustrates the number line for $x_i$ with two threshold values $\tau^i_j$ and $\tau^i_{j'}$.

Overview

Figure 5:
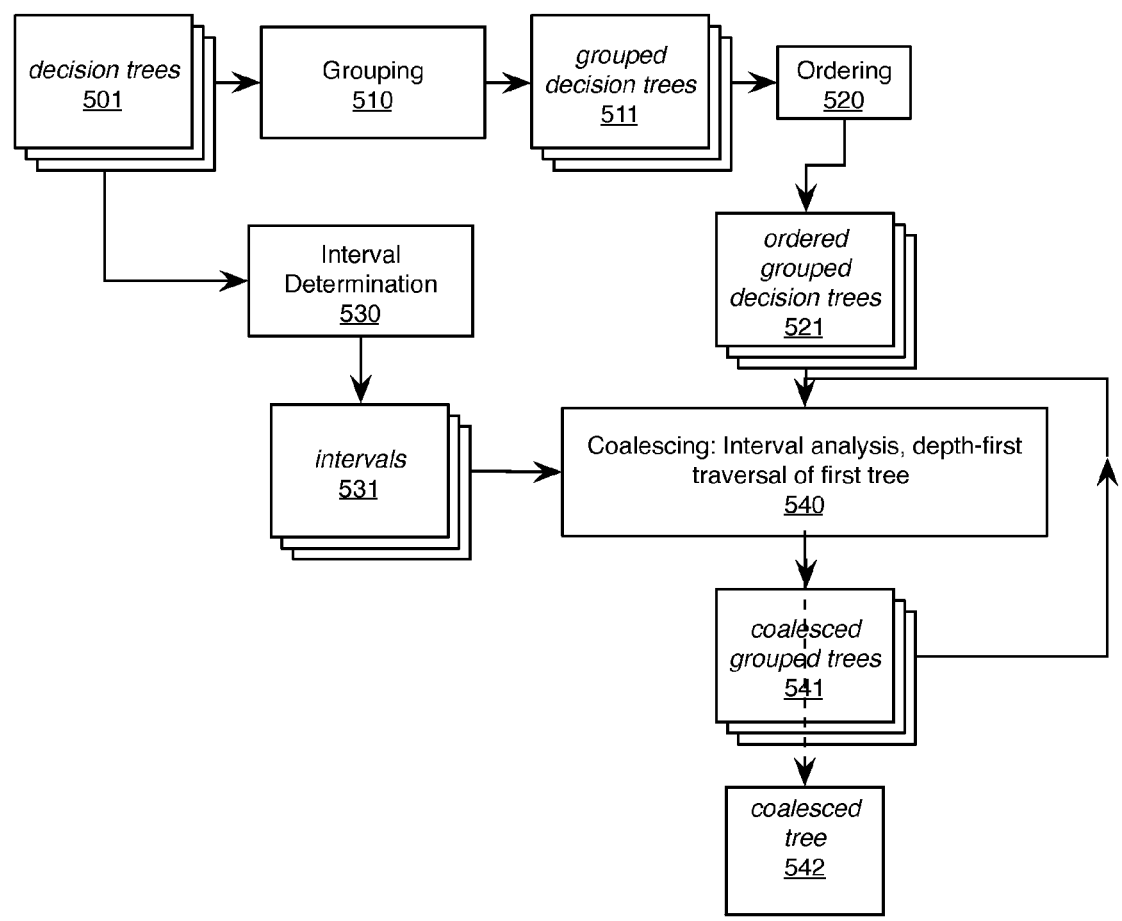
FIG. 5 illustrates a ranking optimization module consistent with some embodiments of the present invention.

FIG. 5 illustrates a ranking optimization module consistent with the present invention. The module coalesces a set of decision trees 501.

An interval determination module 530 analyzes threshold feature values within the decision trees 501 to determine threshold intervals for each feature value. Preferably embodiments simply determine the boundary planes that delimit the threshold intervals. This forms a set of intervals 530; or, in some embodiments, a set of interval boundary coordinates.

A grouping module 510 groups the decision trees according to the feature used in the rood decision node of the tree. This process forms a set of grouped decision trees 511. An ordering module 520 orders the groups to form a set of ordered grouped decision trees 521. Preferably the ordering module 520 orders the trees based on the indices of the feature value used in the root node.

A coalescing module 540 operates on each group from the ordered grouped decision trees 521 to form a coalesced group tree for each group. This forms a set of coalesced group trees 541. Preferably coalescing proceeds incrementally via interval analysis and depth-first traversal of the first tree in each ordered group of decision trees. Coalescing preferably includes updating values stored in the leaf nodes and duplicating sub-trees on a demand basis. Then the coalescing module 540 operates on the set of coalesced grouped trees 541 to form a coalesced tree that implements the algorithm.

Preferred implementations of embodiments of the present invention operating on MLR libraries first use in-built non-intrusive hardware performance counters to identify bottlenecks, such as error in branch choice, in an MLR library. This step helps to achieve maximum return on computing time spent in optimization. However, in some embodiments, an entire MLR library is optimized.

Example

Figures 6, 7:
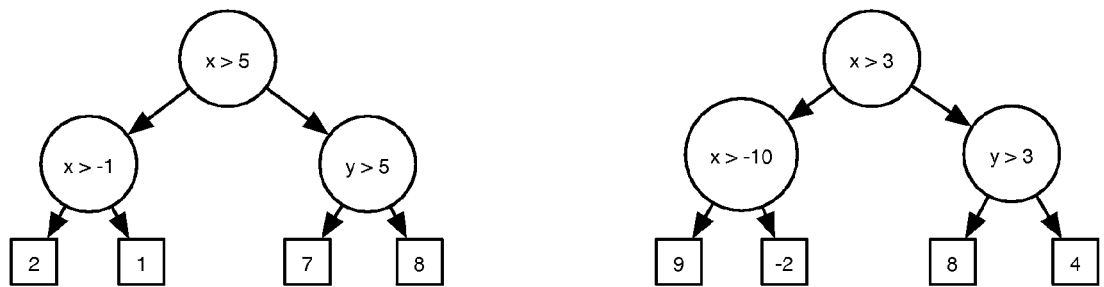
FIG. 6 illustrates a decision tree consistent with a first step of a machine-learned ranking algorithm consistent with some embodiments of the present invention.
FIG. 7 illustrates a decision tree consistent with a second step of a machine-learned ranking algorithm consistent with some embodiments of the present invention.

FIGS. 6, 7, 8, and 9 together illustrate an example of decision tree coalescing. FIGS. 6 and 7 are decision trees serially traversed in an MLR algorithm. Computing ranks via serial traversal of first FIG. 6 and then FIG. 7 would require two compares per tree and one addition per tree (the addition updates the rank score with the leaf node value) which mean six operations.

Figure 8:
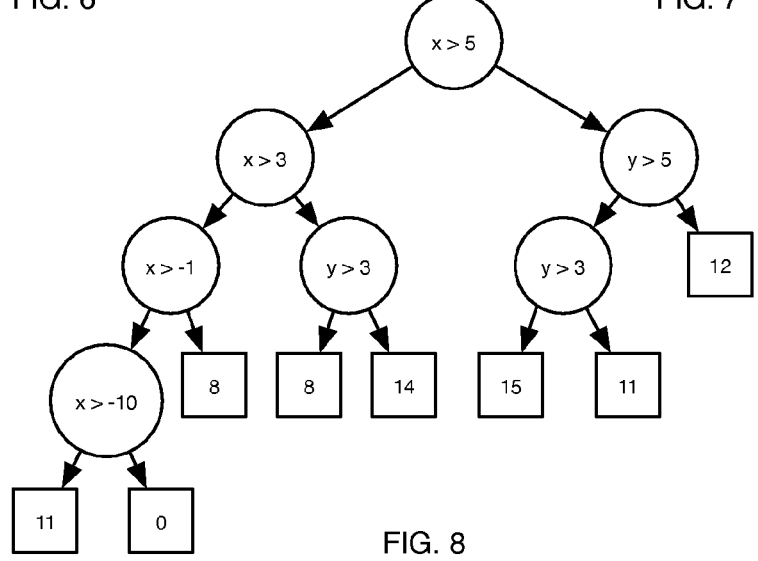
FIG. 8 illustrates an optimized coalesced decision tree consistent with the first and the second steps of a machine-learned ranking algorithm consistent with some embodiments of the present invention.

The corresponding coalesced tree is shown in FIG. 8. This tree has a larger number of internal nodes and leaf nodes and has duplicate nodes corresponding to the conditional y>3. For a given (x, y) traversal of FIG. 8 could take any one of eight paths. Each path has a different number of operations required for traversal, or traversal cost. Averaging across all eight paths, traversing FIG. 8 requires 33/8 operations, or about four operations. Thus, coalescing FIGS. 6 and 7 to FIG. 8 yields a 33% average savings in the traversal cost.

Figure 9:
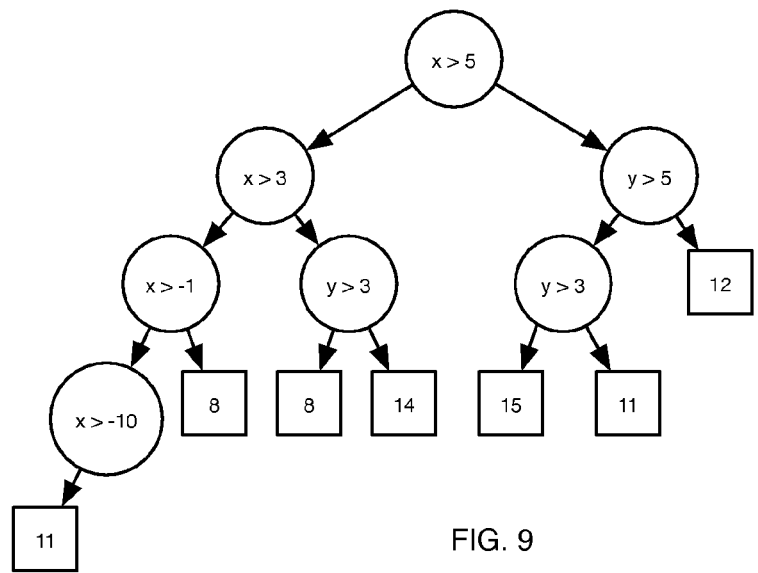
FIG. 9 illustrates a trimmed, coalesced decision tree consistent with the first and the second steps of a machine-learned ranking algorithm consistent with some embodiments of the present invention.

FIG. 9 illustrates a trimmed version of FIG. 8. As mentioned above, coalescing involves updating the values contained in the leaf nodes. For example, the value contained in the left child of the node corresponding to the conditional x>−10 in FIG. 3 is obtained by adding the values contained in the left child of the node corresponding to the conditional x>−1 in FIG. 1 and the left child of the node corresponding to the conditional x>−10 in FIG. 2. In some cases after an update the value in a leaf node is zero. In trimming, zero-valued leaf nodes are eliminated. Elimination is possible because zero-valued leaf nodes do not contribute to the document score. Preferably, node elimination is carried in a bottom-up fashion. Potentially, node elimination reduces the size of the coalesced tree significantly due to a cascading effect. For example, in the binary trees illustrated if both sibling leaf nodes are eliminated then their parent internal node is eliminated. Similarly if both sibling internal nodes are eliminated then their parent internal node is eliminated.

As shown in FIG. 8 the right child of the node corresponding to the condition x>−10 is zero-valued. This is a result of decision tree coalescing of FIGS. 6 and 7. Trimming eliminates the right child of the node corresponding to the condition x>−10 and produces the trimmed, coalesced tree of FIG. 9.

Implementation

Figure 10:
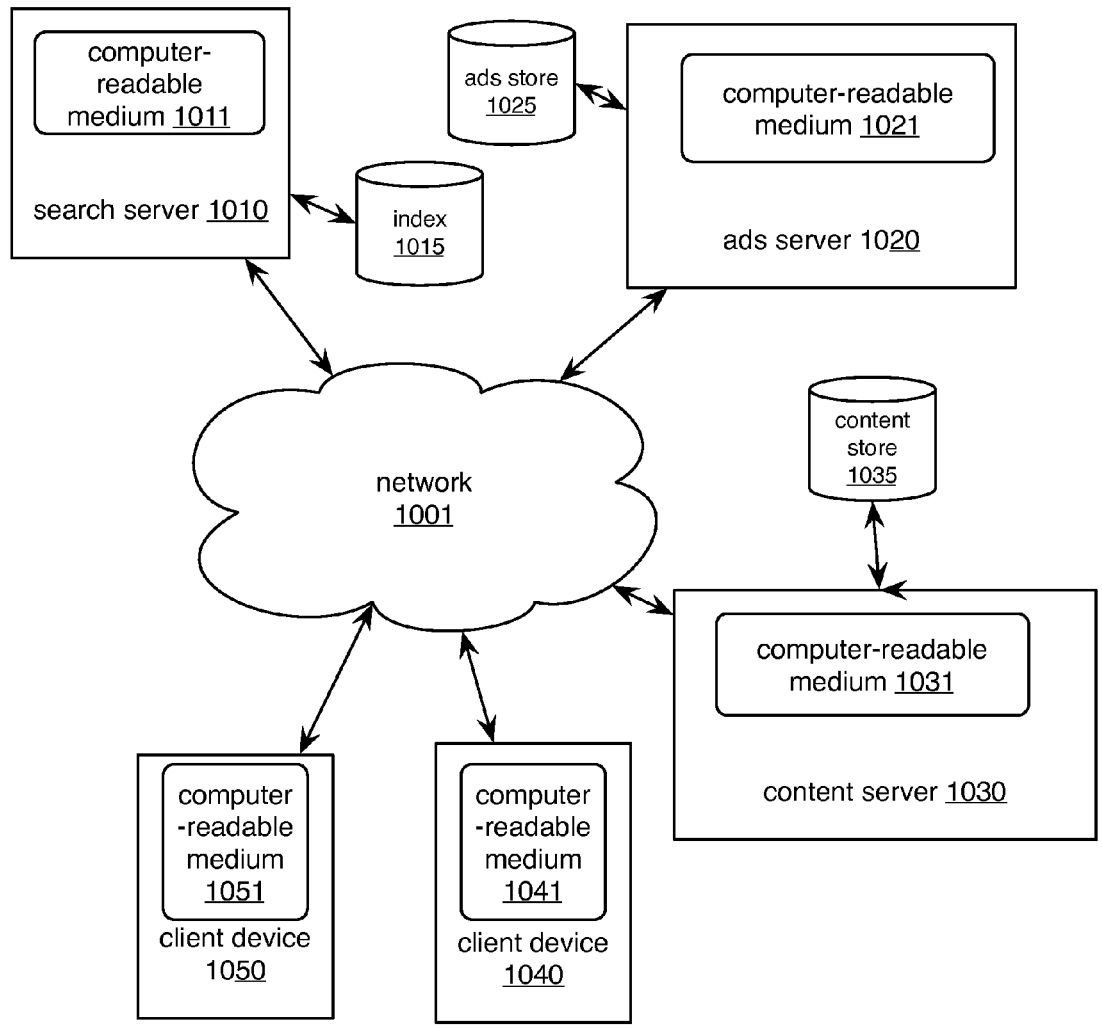
FIG. 10 illustrates an environment in which some embodiments consistent with the present invention are implemented.

FIG. 10 illustrates a system supporting implementations of embodiments of the present invention. The system includes a search server 1010, an ads server 1020, a content server 1030, client devices 1040 and 1050, and a network 1001. Preferably network 1001 is the Internet.

Server and client devices 1010, 1020, 1030, 1040, and 1050 include computer-readable media, 1011, 1021, 1031, 1041, and 1051 respectively, such as random access memory. The devices 1010, 1020, 1030, 1040, and 1050 execute instructions stored in media 1011, 1021, 1031, 1041, and 1051. Servers 1010, 1020, and 1030 additionally use index 1015, ads store 1025, and content store 1035 respectively. Likely client devices include personal computers, mobile devices, and networked content players. Servers may be implemented as networks of computer processors or as single devices.

Search server 1010 receives search ranking module code, preferably asynchronously with serving of search results, and uses search ranking module code to rank documents from index 1015 relative to queries from client devices. Ads server receives ads ranking module code, preferably asynchronously with serving of ads, and uses ranking module code to rank ads from ads store 1025 relative to content from content server 1030.

Preferably code for both search and ads ranking modules is based on MLR library code optimized via decision tree coalescing consistent with embodiments of the present invention. Preferred implementations of embodiments of the present invention operating on MLR libraries in production first use in-built non-intrusive hardware performance counters to identify bottlenecks in an MLR library running on current production hardware.

Advantages

Embodiments are preferably implemented at compile-time, avoiding the need for any algorithmic changes or any hardware changes. In addition, embodiments are not specific to any MLR algorithm, permitting their use across a wide variety of ranking problems.

The optimizations performed are preferably transparent to the designer of the MLR library and the programmer. For example, in some embodiments input of an MLR library implementation and the target hardware platform produces an optimized MLR library. However in some embodiments such input produces a complied library.

Reduction in query processing time reduces of cost per query served, which enables processing of more of queries per dollar of investment. Furthermore, the gains achieved are compounded because query processing typically occurs over a cluster of many servers. From a system-wide perspective, the impact of optimizing MLR via methods consistent with the present invention would be much higher. In addition improved query serving speed corresponds to improved user experience.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A computer-implemented method of optimizing a machine-learned ranking algorithm, comprising:
  a. implementing the algorithm as a sequence of decision trees involving decision nodes based on threshold values of features;
  b. analyzing the threshold feature values to determine threshold intervals for each feature;
  c. grouping the decision trees according to the feature used in a root decision node;
  d. coalescing the decision trees within each group to form a coalesced group tree for each group; and
  e. coalescing the coalesced group trees to form a coalesced tree that implements the algorithm.

2. The computer-implemented method of claim 1, wherein coalescing proceeds by traversing the first decision tree of a group, updating values stored in leaf nodes of the first decision tree and incorporating portions of other decision trees.

3. The computer-implemented method of claim 1, further comprising trimming the coalesced tree to form a coalesced trimmed tree.

4. A ranking optimization module for optimizing a machine-learned ranking algorithm implemented as a sequence of decision trees involving decision nodes based on threshold values of features, comprising:
   a. a grouping element configured to group the decision trees according to the feature used in a root decision node;
   b. an interval determination element configured to analyze the threshold feature values to determine threshold intervals for each feature; and
   c. a coalescing element configured to coalesce the decision trees within each group to produce a coalesced group tree for each group and to coalesce the coalesced group trees to produce a coalesced tree that implements the algorithm.

5. The ranking optimization module of claim 4, wherein coalescing proceeds by traversing the first decision tree of a group, updating values stored in leaf nodes of the first decision tree and incorporating portions of other decision trees to produce a coalesced group tree for the group.

6. The ranking optimization module of claim 4, wherein the machine-learned ranking algorithm is embodied in a software library.

7. The ranking optimization module of claim 4, wherein the coalesced tree produced is embodied in a software library.

8. The ranking optimization module of claim 4, further comprising a trimming element configured to reduce the size of the coalesced tree.

9. The ranking optimization module of claim 4, wherein trimming proceeds by eliminating zero-valued nodes.

10. The ranking optimization module of claim 4, wherein the coalesced tree produced algorithm is embodied in computer-readable code.

11. A system for providing results ranked by an optimized machine-learned ranking algorithm, comprising:
   a. retrieval module for selecting a document set based on an action by a user;
   b. ranking module for ranking the document set based on a machine-learned ranking algorithm optimized via decision-tree coalescing to form a ranked results set;
   c. serving module configured to serve a portion of the ranked results set to the user.

12. The system of claim 11, wherein the ranking module is complied from a machine-learned ranking library.

13. The system of claim 12, wherein the ranking module is optimized during compilation.

14. The system of claim 11, wherein the ranking module is complied from an optimized machine-learned ranking library optimized via decision-tree coalescing prior to compilation.

15. The system of claim 11, wherein the ranked results set is web documents and the user action is entry of a search query.

16. The system of claim 11, wherein the ranked results set is advertisements.

17. The system of claim 11, wherein the decision-tree coalescing occurs asynchronously relative to the action by the user.

* * * * *